US007116475B2

(12) United States Patent
O'Connell et al.

(10) Patent No.: US 7,116,475 B2
(45) Date of Patent: *Oct. 3, 2006

(54) NEAR-FIELD INTRA-CELLULAR APERTURELESS MICROSCOPE

(75) Inventors: Daniel G. O'Connell, Oro Valley, AZ (US); Caitlin E. O'Connell-Rodwall, Menlo Park, CA (US)

(73) Assignee: Nanopoint, Inc., Honolulu, HI (US)

( * ) Notice: Subject to any disclaimer, the term of this patent is extended or adjusted under 35 U.S.C. 154(b) by 71 days.

This patent is subject to a terminal disclaimer.

(21) Appl. No.: 10/463,810

(22) Filed: Jun. 18, 2003

(65) Prior Publication Data

US 2006/0119934 A1    Jun. 8, 2006

Related U.S. Application Data

(60) Provisional application No. 60/389,289, filed on Jun. 18, 2002.

(51) Int. Cl.
*G02B 21/06* (2006.01)
(52) U.S. Cl. ..................... 359/385; 359/368
(58) Field of Classification Search ............. 359/368, 359/385, 390; 356/301; 250/458.1, 461.2
See application file for complete search history.

(56) References Cited

U.S. PATENT DOCUMENTS

| 5,004,307 | A | 4/1991 | Kino et al. |
| 6,219,137 | B1 * | 4/2001 | Vo-Dinh ..................... 356/301 |
| 6,379,955 | B1 * | 4/2002 | Kopelman et al. ........... 435/325 |
| 2003/0018457 | A1 * | 1/2003 | Lett et al. ....................... 703/11 |

OTHER PUBLICATIONS

Tang et al.; *Consideration and control of writing conditions with a near-field APSIL probe*; Proceedings of International Symposium on Optical Memory and Optical Data Storage/2002; ISBN 0-7803-7379-0; Published:2002; pp. 243-245.

Milster et al.; *Super-Resolution by Combination of a Solid Immersion Lens and Aperture*; The Japanese Society of Applied Physics, Part 1, No. 3B: Mar. 2001.

Hecht et al.; *scanning near-field optical microscopy with aperture probes: Fundamentals and applications*; Special Topic: Near-field Microscopy and Spectroscopy: Journal of Chemical Physics; vol. 112, No. 18; May 8, 2000.

Betzig & Chichester; *Single Molecules Obseerved by Near-field Scanning Optical Microscopy*; Science, New Series; vol. 262, No. 5138; Nov. 26, 1993; pp. 1422-1425.

(Continued)

*Primary Examiner*—Drew A. Dunn
*Assistant Examiner*—Joshua L Pritchett
(74) *Attorney, Agent, or Firm*—James Creighton Wray

(57) ABSTRACT

Sub-wavelength size fluorescent particles attach to specific gene sites or a magnetic bead that is maneuvered around a cell volume to produce evanescent fields when illuminated in the far-field from light outside the cell volume. Light scattering from the sub-wavelength particles produces near-field interactions with surrounding molecules. The sub-wavelength scattering particles may be metallic spheres. Using particles within the cell removes large far-field scattered light from the mechanical structure of a supporting probe. Near-field light is modulated with an oscillating magnetic field, and micro-positioning is accomplished by a computer controlled DC magnetic field to scan the particle around within the cell. The Near-Field Intra-Cellular Apertureless Microscope (NICAM) technique enables non-destructive sub-wavelength resolution imaging without inserting a near-field (illumination or collection mode) probe into a cell.

27 Claims, 4 Drawing Sheets

OTHER PUBLICATIONS

Mansfield & Kino; *Solid Immersion Microscope*; Appl. Physics Letter; vol. 57, No. 24; Dec. 10, 1990.

D. V. Palanker et al.; *On contrast parameters and topographic artifacts in near-field infrared microscopy*; Journal of Applied Physics, vol. 88, No. 11; Dec. 1, 2000.

Tom D. Milster et al.; *The Nature of the Coupling field in Optical Data Storage using Solid Immersion Lenses*; The Japanese Society of Applied Physics, Part 1, No. 3B: Mar. 1999.

Jonathan D. Bui et al.; *Probing intracellular dynamics in living cells with near-field optics*; Journal of Neuroscience Methods 89 (1999) 9-15; Feb. 27, 1999.

* cited by examiner

NEAR-FIELD INTRA-CELLULAR APERTURELESS MICROSCOPE

This application claims the benefit of U.S. Provisional Application No. 60/389,289, filed Jun. 18, 2002.

BACKGROUND OF THE INVENTION

Needs exist for illuminating and selectively illuminating small objects, particularly cells and molecules on or within cells.

The invention keeps the cells completely intact during particle scanning and subsequent near-field microscopy data collection for improving knowledge of the inner structures of living cells without damaging the cells.

SUMMARY OF THE INVENTION

Single sub-wavelength size light or energy scattering single particle, or multiple particles, that either produces fluorescence emission or scattering under far-field illumination, thereby producing evanescent fields that interact with surrounding sub-cellular molecular constituents.

Mechanisms of gene silencing are poorly understood. Nuclear receptors bound by hormones are able to activate as well as to repress genes. The detailed mechanism of the signal transduction between the nuclear receptor and the RNA polymerase inside the nucleus remains unclear. There exists a need to penetrate a cell membrane and image the inside of an intact cell to understand the mechanisms underlying nuclear receptor action and provide novel insights into gene regulatory pathways.

Scanning near-field optical microscope (SNOM or NSOM) probes are designed to move over the surface of the object being measured, maintaining a constant probe distance from a surface at the nanometer scale while scanning across the surface to obtain nanometer scale resolution images. Scanning near-field optical microscopy (SNOM) is an optical technique capable of resolving beyond the diffraction limit, where resolutions in the 20 nm range have been demonstrated. The SNOM technology has been applied to cells and to plasma membranes. The high-resolution imagery reveals detail of the cytoskeletal actin not obtainable by any other methods.

SNOM has achieved nano-resolution scales where single molecules have been studied. Near-field techniques circumvent the diffraction limit imposed on conventional light microscopes to obtain sub-wavelength spatial resolution. SNOM instruments are not capable of penetrating into a living cell or imaging intracellular regions.

This invention is an improvement for near-field intra-cellular microscope technology described in applicant's co-pending provisional application, which is incorporated herein by reference, in its entirety. The present invention does not depend on a near-field probe type instrument to penetrate the cell membrane and then to scan around the cell volume to collect sub-wavelength resolution imagery and spectroscopy. The benefit of this invention is that the cell is kept completely intact during the particle scanning and subsequent near-field microscopy data collection.

In a preferred embodiment, the invention makes use of sub-wavelength size fluorescent particles that attach to specific gene sites or a particle that is attached to a magnetic bead that may be maneuvered around the cell volume to produce evanescent fields when illuminated in the far-field from light outside the cell volume. Light scattering from the sub-wavelength particles produces near-field interactions with surrounding molecules.

The subwavelength scattering particles may be metallic spheres such as, but not limited to gold or silver, to enhance the evanescent field interactions with the molecules within living cells. Due to their plasma frequency, silver particles benefit from plasmon resonance enhancement in the visible region of the spectrum, while gold particles exhibit plasmon resonance in the infrared.

The use of particles within the cell, rather than illumination or collection mode probes, removes the large far-field scattered light from the mechanical structure of a supporting probe in other apertureless configurations. The near-field light is modulated with an oscillating magnetic field, and micro-positioning is accomplished by a computer controlled DC magnetic field to scan the particle around within the cell.

A preferred embodiment of the present invention is the Near-Field Intra-Cellular Apertureless Microscope (NICAM) technique which is an apertureless near-field technique. The present invention enables non-destructive sub-wavelength resolution imaging without inserting a near-field (illumination or collection mode) probe into a cell.

If a cell population were treated with an inhibitor of histone deacetylase to induce a global increased acetylation of crucial lysines on histones in chromatin, it would be possible to "image" the subsequent conformational changes that could occur at these sites where previously silenced genes become activated. The fluorescent bead targets fluorescently labeled genes that were silenced in the untreated sample, images the conformation of silenced genes in-situ in live cells and compares the images with the treated sample where the florescent genes of interest are now expressed.

Questions relating to transcription, translation, and gene silencing are addressed with such a technology. Understanding the mechanics of these processes at this resolution provides a much better concept of gene expression and ultimately leads to a better understanding of cell replication, development and differentiation, tumor formation, and aging.

These and further and other objects and features of the invention are apparent in the disclosure, which includes the above and ongoing written specification, with the claims and the drawings.

BRIEF DESCRIPTION OF THE DRAWINGS

FIG. 4 shows sub-wavelength fluorescent particle attached to the tip of a probe such as for example, a micropipette or the like.

DETAILED DESCRIPTION OF THE PREFERRED EMBODIMENTS

Figure 1:
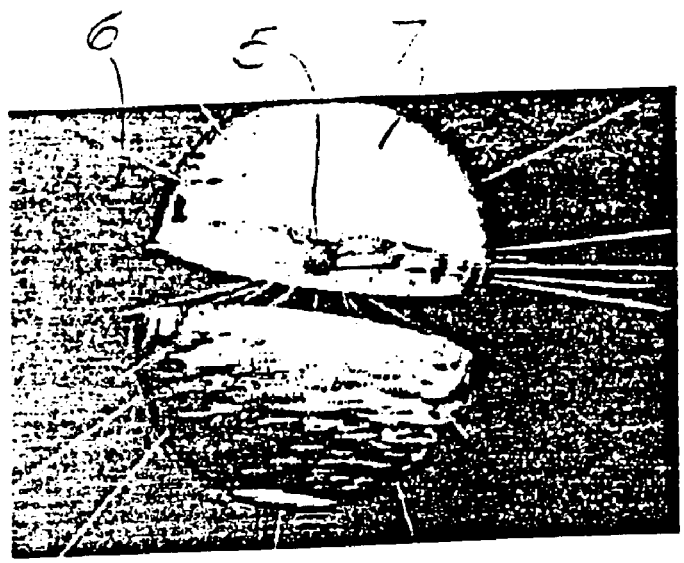
FIG. 1 is a perspective view of a near-field intra-cellular apertureless microscope (NICAM) system imaging.

As shown in FIG. 1, the NICAM system is a technique that uses a fluorescent particle 5 (or another light scattering nano-particle) that is inserted inside a cell 7 or attached to a biological macromolecule, such as DNA, within the cell. The subwavelength particle 5 responds to highly localized electro-magnetic interactions with the surrounding molecules. The particle 5 provides rays 6 of fluorescence. This technology enables the area surrounding individual genes to be imaged within a schematically shown living cell 7, which is currently not possible, with conventional devices, with this resolution (<50 nm). In one case, as shown in FIG. 1, a light fiber 11 has the particle 5 attached at a distal end 13 of the fiber.

The NICAM technique removes the surface boundary dependence to allow full 3D volumetric imaging by measuring the modulation of the near-field light throughout the cell volume. Contrast mechanisms are molecular interactions themselves producing high-resolution unambiguous near-field image and spectroscopy information. To further separate near-field from far-field light, the particle is attached to a magnetic particle which may be dithered to produce a modulation of the evanescent field interaction with the surrounding molecules.

This invention makes use of sub-wavelength size fluorescent particles that are either attached to a specific gene site or attached to a magnetic bead that is maneuvered around the cell volume to produce evanescent fields when illuminated in the far-field or light outside the cell volume. Light scattering from the sub-wavelength particles produces near-field interactions with surrounding molecules. The use of particles within the cell (rather than an aperture probe), removes the large far-field scattered light from the mechanical structure of a supporting probe in other aperture probes or apertureless configurations. The near-field light may be modulated with an oscillating magnetic field and micropositioning is accomplished by a computer controlled DC magnetic field (magnetic tweezer) to scan the particle around within the cell.

The subwavelength scattering particles may be metallic spheres such as, but not limited to gold or silver, to enhance the evanescent field interactions with the molecules within living cells. Due to their plasma frequency, silver particles benefit from plasmon resonance enhancement in the visible region of the spectrum, while gold particles exhibit plasmon resonance in the infrared.

Figure 2:
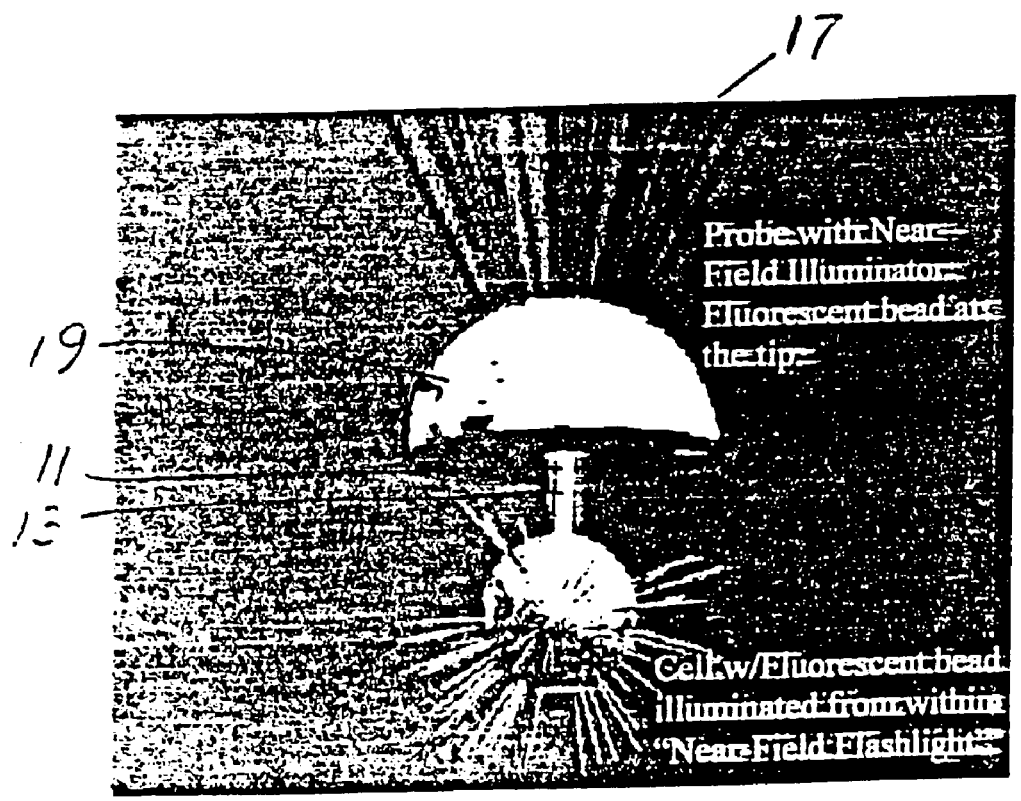
FIG. 2 is a perspective view of a fluorescent particle attached to a tip of a micropipette.

In an embodiment of the present invention, as shown in FIG. 2, the near-field intra-cellular apertureless microscope (NICAM) illumination system 1 uses an apertureless near-field optical imaging technique with a fluorescent nano-particle 5 as a near-field light source. Sub-wavelength resolution images are collected from the interaction of evanescent optical fields and biological molecules within living cells. This technique achieves 50 nm resolutions or less from within living cells without using an intrusive probe to enter inner cellular regions. A probe 15 has a housing 17 at its tip for housing the optical fiber 11 and the particle 5, which is shown inserted into a cell 7.

The NICAM system 1 also uses non-fluorescing nano-particles 3 that serve as sub-wavelength scattering sites to produce evanescent field interactions. Either particle, light scattering non-fluorescing 3 and/or fluorescing 5, is maneuvered around the cell volume using laser micromanipulation. The particles may also be attached to a magnetic particle and maneuvered using magnetic micromanipulation. In the infrared range, the light scattering particle 5 enables near-field vibrational spectroscopic measurements without intruding on the cell 10. The sub-wavelength size particle or particles 3, 5, allows for the near-field interaction of an apertureless configuration.

Fiber 11 may release the particle 5, which may be attached to a magnetic particle 19 and maneuvered by magnetic micromanipulation with magnetic "tweezers" in housing 17 in FIG. 2.

Figure 3:
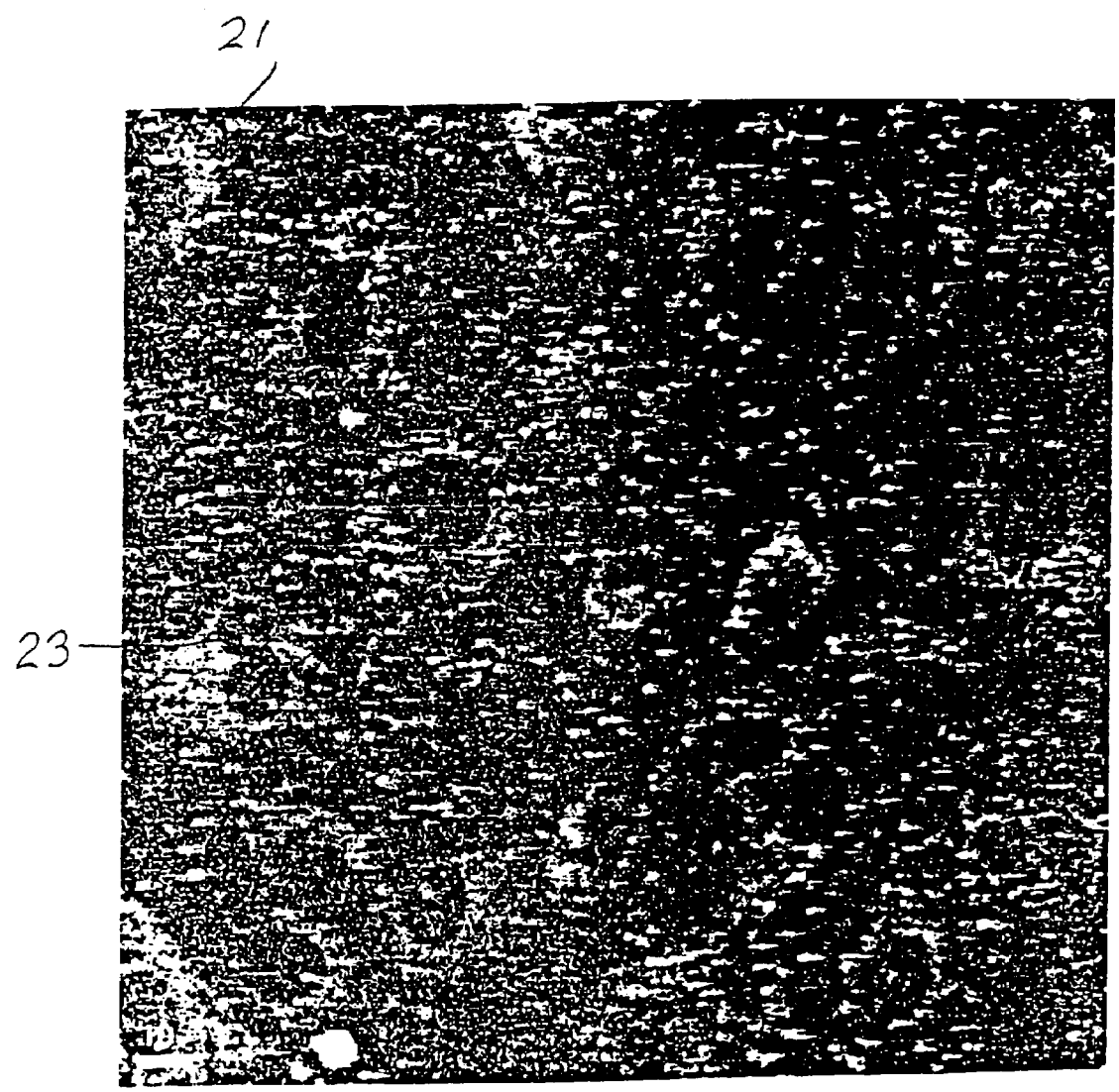
FIG. 3 shows fluorescent particles within mitotic cells used as near-field light sources.

As seen in FIG. 3, a preferred embodiment includes an apertureless near-field optical imaging technique that makes use of a sub-wavelength particle 3, 5, introduced into a living cell 7 non-invasively and illuminated externally by far-field illumination. These particles may be fluorescing 5 or non-fluorescing 3 scatterers. The fluorescing particle 5 may be a fluorescent bead. Evanescent fields are generated from the sub-wavelength particles 3, 5, that interact with the surrounding biological molecules which produces high resolution image information that is collected externally in the near field or far-field.

The evanescent fields are coupled to propagating fields by molecular interactions. This is an apertureless near-field microscope technique that enables sub-wavelength 3D volumetric imaging of living cells, which provides higher resolution than the current state of art confocal microscopes that are limited by diffraction. Near-field microscopy techniques (SNOM or NSOM) are limited to scanning over a surface to collect surface topography information.

The particles in the medium 21 around the mitotic cells 23 may illuminate the cells or excite fluorescent tags on molecules attached to the cells or within cells. Preferably, the cells uptake the sub-wavelength particles, and fluorescence from the particles illuminate molecules within the cells or on surfaces of he cells. Alternatively the sub-wavelength particles attach to the cells surfaces and illuminate molecules in or on the cells.

Preferably, the NICAM system uses an individual sub-wavelength particle that is maneuvered within the cell volume using laser trapping or magnetic micromanipulation. The sub-wavelength fluorescent particle may be attached to a magnetic particle, which is positioned using an adjustable magnetic field or magnetic tweezer device.

The NICAM system 1 may also use a non-fluorescing sub-wavelength particle 3 inserted into a living cell to collect high-resolution near-field information in the localized area surrounding the particle on the molecular scale. This particle 3 may be illuminated externally from outside the cell using far-field collimated illumination, such as but not limited to, a laser, light fiber or pipette. Scattering occurs from the particle generating evanescent fields surrounding the particle. The advantage of this technique is that the near-field interaction is not overcome by far-field scattered light from a physical support probe in an aperture probe technique resulting in higher signal to noise near-field measurements. This particle is maneuvered using micromanipulation using laser or magnetic tweezers.

In addition to near-field imaging using sub-wavelength fluorescent particles 5 for visible and near-infrared wavelengths, a sub-wavelength magnetic particle may be used in the mid- and far-infrared wavelengths as a remote magnetically controlled micro-positioning near-field scattering source. This enables the collection of infrared absorption spectroscopic information with sub-wavelength resolution. By tuning the illumination source, a "Near-Field Differential Absorption Spectroscopy" measurement is made which has higher localization capability over current Fourier Transform Infrared Spectroscopy (FTIR) techniques.

Figure 4:
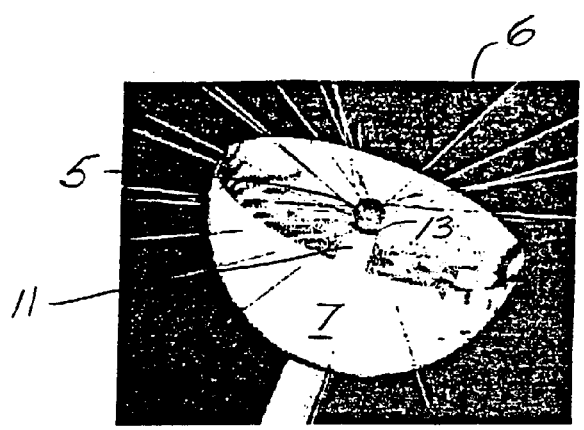
Figure 5:
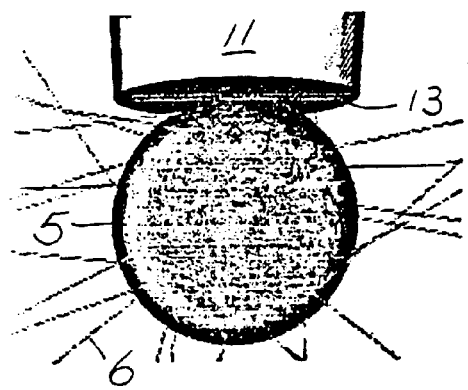
FIG. 5 shows a fluorescent particle attached to a probe such as a micropipette or similar probe.

As seen in FIGS. 4 and 5, a sub-wavelength fluorescent particle 5 may be attached to the tip 13 of a fiber 11 such as, but not limited to, a micropipette, fiber or other similar probe. This provides a sub-wavelength size light source projecting illumination 6 for near-field imaging of the cell 7 and molecules in or on the cell. The fluorescent particle or bead 5 may be illuminated with light transmitting through the fiber 11 shaft or externally by other means. The supporting probe, as shown in FIG. 2, provides the mechanical means to position the nano-particle in the desired location and to scan the particle around within the cell.

Alternatively, in a preferred embodiment, the sub-wavelength nano-particle gets into a cell or is taken up by the cell naturally without intrusion by an implantation fiber. The nano-particle 5 produces near-field interactions with surrounding molecules at specific gene sites or the particle scanned around the cell volume similar to raster scanning.

Figure 6:
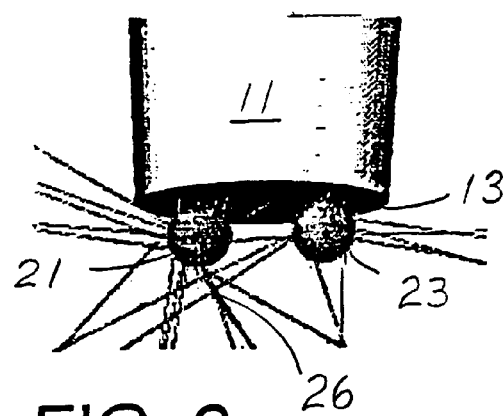
FIG. 6 shows two particles attached to a probe producing near-field interference effects to distinguish near-field from far-field light.

As seen in FIG. 6, more than one particle fluorescing sub-wavelength particle 21, 23 may be used to produce near-field interference effects 26 to aid in the distinction between near-field and far-field light.

Figure 7:
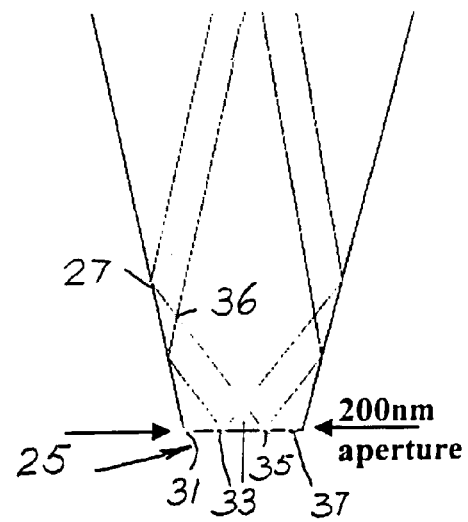
FIG. 7 shows illumination methods with laser illuminators.

As seen in FIG. 7, laser illuminators 25, 27, may be used. One of those laser illuminators 27 may focus illumination through the supporting fiber or probe and one of those illuminators 25 may provide remote illumination. Laser illuminator 25 may illuminate some or all particles 31, 33, 35, 37. The other laser illuminator 27 may illuminate some or all particles. The laser frequencies may be distinct or identical. Interference 36 patterns from the multiple point sources 31, 33, 35, 37, aids in display and identification of the molecules.

Figure 8:
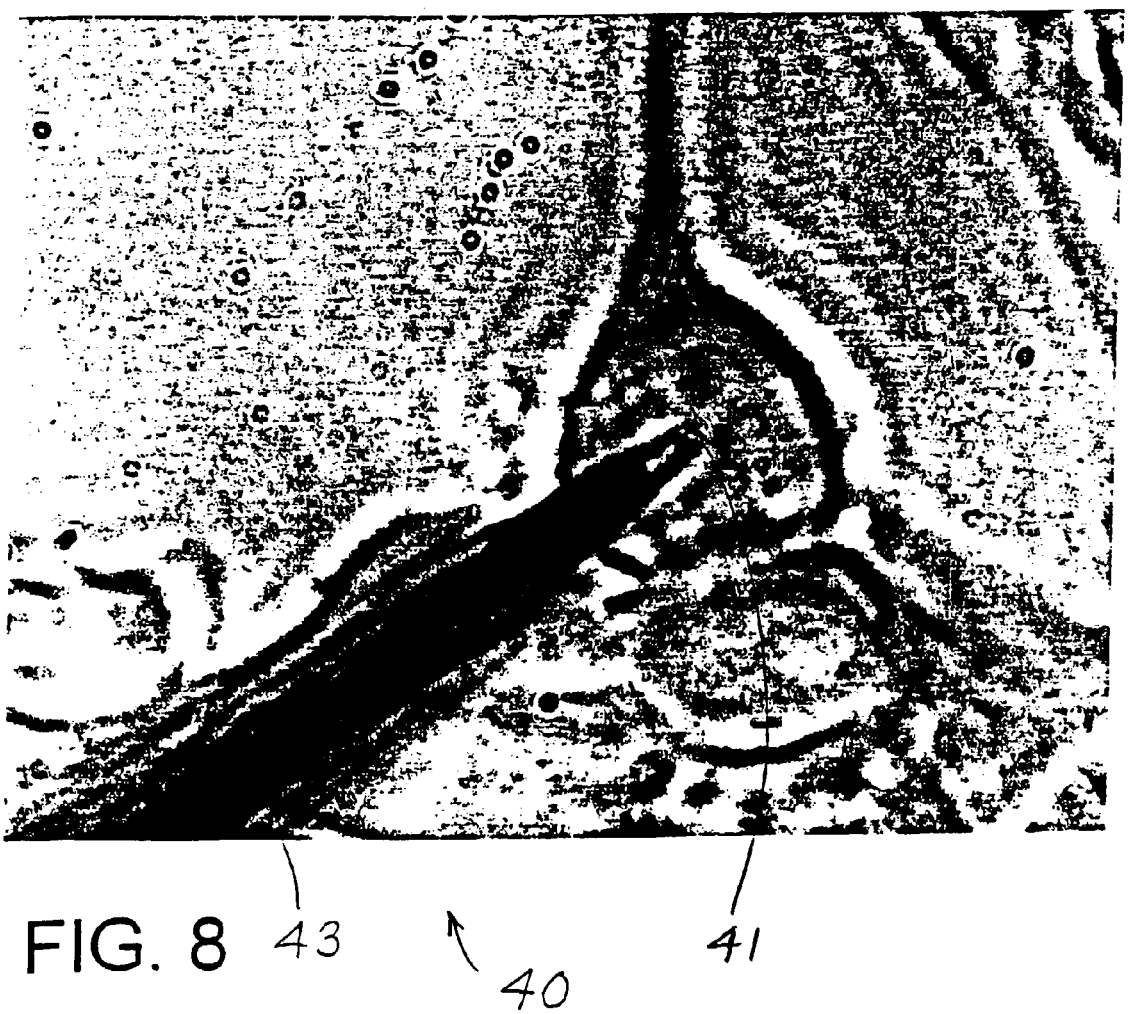
FIG. 8 is a microscopic image of a POINT probe.

In preferred embodiments, fiber 11 is beneficial to deliver light of specific wavelength, energy and duration. Therefore, a sub-wavelength particle 3, 5, can be attached to the tip 13 of a fiber 11. The benefit of this technique is that even though a fiber is used to insert nano-particles inside a cell, the fiber geometry may be optimized for minimal cell damage, which is a tremendous benefit over current limitations of near-field microscopy. Currently the only technique that enables intra-cellular imaging of living cells is Applicant's POINT technique 40 shown by the microscope imaging at the point 41 of probe 43 in FIG. 8, described in a co-pending application, incorporated herein by reference in its entirety.

Sub-wavelength fluorescent beads (preferably, but not limited to, 100 nm or less) are used as point illuminators or near-field light sources. It is difficult to get sufficient light through an aperture that is 100 nm or less using visible wavelengths. Light transmission suffers according to $(r/\lambda)^4$. However, instead of using a sub-wavelength aperture, the present invention uses a sub-wavelength fluorescent bead 5 and other particles 3 at the end of a small probe. This probe can have small dimensions without consideration of light throughput since the probe serves only as a mechanical mount for the near-field illuminating particle. This configuration enables multiple sub-wavelength fluorescent particles or near-field point sources simultaneously.

The benefit of this technique is that fluorescent enhancement or plasmon resonance enhancement techniques is utilized by attaching various sub-wavelength particles to the base of a probe. Illumination may be accomplished through the probe or by far-field illumination of the particle from outside the cell, as seen in FIG. 7. Preferably the bead is used without the probe structure. However, in certain instances signal enhancement is achieved with the aid of plasmon resonance in a metallic probe.

The NICAM system provides near-field imaging with a sub-wavelength particle. Additionally, the NICAM system is also useful for near-field tomographic imaging (NICAT) within a living cell wherein the fluorescent bead is used as a point illuminator to sub-wavelength resolution. The NICAT system is described in a co-pending provisional application, which is incorporated herein by reference in its entirety.

While the invention has been described with reference to specific embodiments, modifications and variations of the invention may be constructed without departing from the scope of the invention, which is defined in the following claims.

We claim:

1. A near field intra-cellular apertureless microscope apparatus comprising a light scattering nano-particle for positioning non-invasively in a cell, an illuminating device for illuminating the nano-particle, and a processor communicating with the nano-particle for measuring modulation of near-field light from the nano-particle, collecting data in the cell, and for non-invasively determining full 3-D volumetric imaging of the cell, wherein the nano-particle is a sub-wavelength particle responding to localized interactions with surrounding molecules, wherein the nano-particle is a fluorescent particle providing fluorescence for illuminating and imaging areas surrounding the particle in the cell, wherein the fluorescent particle is insertable in the cell, further comprising a positioning device for positioning the fluorescent particle in the cell, wherein the positioning device is an optical fiber having a distal end, wherein the fluorescent particle is coupled to the distal end of the fiber, and further comprising a housing for housing the optical fiber and the fluorescent particle.

2. The apparatus of claim 1, wherein the cell is a living cell.

3. The apparatus of claim 1, wherein the fluorescent particle is attachable to a biological macromolecule in the cell.

4. The apparatus of claim 3, wherein the macromolecule is a DNA molecule.

5. The apparatus of claim 1, wherein the positioning device is selected from a group consisting of micropipettes, fibers, probes, and combinations thereof.

6. The apparatus of claim 1, wherein data collected from the cell comprises information on molecular interactions producing high-resolution unambiguous near-field image and spectroscopy information.

7. The apparatus of claim 1, further comprising a magnetic particle coupled to the fluorescent particle for distinguishing near-field light from far-field light.

8. The apparatus of claim 7, wherein the magnetic particle is dithered for modulating evanescent field interactions with the surrounding molecules, and wherein light scattering from the fluorescent particle produces near-field interactions with surrounding molecules.

9. The apparatus of claim 8, further comprising an oscillating magnetic field device for modulating the near-field light.

10. The apparatus of claim 9, further comprising a computer controlled magnetic field device for micro-positioning and scanning the particle in the cell.

11. The apparatus of claim 10, further comprising sub-wavelength resolution images derived from interaction of evanescent optical fields of the fluorescent particle with the molecules within the cell.

12. The apparatus of claim 11, wherein the images have at least 50 nm resolutions.

13. The apparatus of claim 1, wherein the nano-particle is a non-fluorescing particle forming sub-wavelength particle scattering sites to produce evanescent field interactions.

14. The apparatus of claim 1, further comprising a laser device for maneuvering the nano-particle around in the cell by laser micromanipulation.

15. The apparatus of claim 1, further comprising a magnetic device for maneuvering the nano-particle in the cell by magnetic micromanipulation.

16. The apparatus of claim 1, wherein the light scattering particle enables near-field vibrational spectroscopic measurements in an infrared range without cell-intrusion.

17. The apparatus of claim 16, wherein the nano-particle comprises plural sub-wavelength particles for producing near-field interference effects to distinguish between near-field light and far-field light.

18. The apparatus of claim 17, wherein the illuminating device is one or more laser illuminators.

19. The apparatus of claim 18, wherein the one or more laser illuminators provides remote illumination.

20. The apparatus of claim 18, wherein the one or more laser illuminators illuminate one or more of the particles.

21. The apparatus of claim 20, wherein the one or more laser illuminators have identical or distinct laser frequencies.

22. The apparatus of claim 1, wherein the illuminating device is one or more laser illuminators.

23. The apparatus of claim 22, wherein the laser illuminators focus illumination through the optical fiber or probe.

24. The apparatus of claim 1, wherein the sub-wavelength particle is metallic spheres for enhancing evanescent field interactions with the molecules in the cell.

25. The apparatus of claim 24, wherein the metallic spheres are gold or silver spheres.

26. The apparatus of claim 24, wherein the metallic spheres are silver spheres and wherein the silver spheres have plasma frequencies exhibiting plasmon resonance enhancement in a visible region of light spectrum.

27. The apparatus of claim 24, wherein the metallic spheres are gold spheres and wherein the gold spheres have plasma frequencies exhibiting plasmon resonance in an infrared region.

* * * * *